(12) United States Patent
Yabe et al.

(10) Patent No.: US 7,715,455 B2
(45) Date of Patent: May 11, 2010

(54) SOLAR LIGHT PUMPED LASER AND COOLING METHOD OF SOLAR LIGHT PUMPED LASER

(75) Inventors: Takashi Yabe, Tokyo (JP); Shigeaki Uchida, Tokyo (JP)

(73) Assignee: Tokyo Institute of Technology, Tokyo (JP)

( * ) Notice: Subject to any disclaimer, the term of this patent is extended or adjusted under 35 U.S.C. 154(b) by 1 day.

(21) Appl. No.: 11/908,896

(22) PCT Filed: Mar. 10, 2006

(86) PCT No.: PCT/JP2006/304733

§ 371 (c)(1),
(2), (4) Date: Jan. 10, 2008

(87) PCT Pub. No.: WO2006/100941

PCT Pub. Date: Sep. 28, 2006

(65) Prior Publication Data

US 2008/0225912 A1      Sep. 18, 2008

(30) Foreign Application Priority Data

Mar. 18, 2005   (JP) ............................ 2005-079446

(51) Int. Cl.
*H01S 3/04*   (2006.01)
(52) U.S. Cl. .......................................... 372/35; 372/79
(58) Field of Classification Search ................. 372/35, 372/79
See application file for complete search history.

(56) References Cited

U.S. PATENT DOCUMENTS 4,281,294 A * 7/1981 Volkin .......................... 372/79
2003/0006129 A1  1/2003 Imasaki et al.

(Continued)

FOREIGN PATENT DOCUMENTS

EP       1860747     * 11/2007

(Continued)

OTHER PUBLICATIONS

Lando et al. "A Solar-Pumped Nd:YAG Laser in the High Collection Efficiency Regime", Optics Communications, vol. 222, 2003, pp. 371-381.

(Continued)

*Primary Examiner*—Dung T Nguyen
(74) *Attorney, Agent, or Firm*—Greenblum & Bernstein, P.L.C.

(57) ABSTRACT

Object: To provide a solar light pumped laser and a cooling method of a solar light pumped laser.
Means for Solving the Problems: A solar light pumped laser performing laser oscillation by pumping a laser medium with solar light, the solar light pumped laser including, a laser medium 12, a container device 14 that supports the laser medium 12 therein, the container device 14 being provided with a focusing optical element 22 for irradiating solar light focused along the laser medium 12, while retaining cooling liquid in a space between the laser medium 12 and the container device 14, and additionally, a pair of optical reflection elements (16, 18) arranged adjacent to the opposing ends of the laser medium. An end of the container device 14 has Brewster's angle. Further, the cooling liquid according to the present invention contains water functioning as an optical medium to form a water lens simultaneously with cleaning the focusing optical element 22.

14 Claims, 9 Drawing Sheets

U.S. PATENT DOCUMENTS

2009/0010837 A1 * 1/2009 Yabe et al. .................. 423/657

FOREIGN PATENT DOCUMENTS

| | | |
|---|---|---|
| JP | 61-272986 | 12/1986 |
| JP | 7-240553 | 9/1995 |
| JP | 11-284256 | 10/1999 |
| JP | 2002-255501 | 9/2002 |
| JP | 2003-12569 | 1/2003 |
| JP | 2003-188441 | 7/2003 |
| JP | 2006-295137 * | 10/2006 |
| JP | 2007-227406 * | 9/2007 |

OTHER PUBLICATIONS

English Language Abstract of JP 11-284256.
English Language Abstract of JP 61-272986.
English Language Abstract of JP 2003-188441.
English Language Abstract of JP 2003-12569.
English Language Abstract of JP 2002-255501.
English Language Abstract of JP 7-240553.

* cited by examiner

↑ primary optical elements (b)

SOLAR LIGHT PUMPED LASER AND COOLING METHOD OF SOLAR LIGHT PUMPED LASER

FIELD OF THE INVENTION

The present invention relates to a solar light pumped laser performing laser oscillation by pumping a laser medium with solar light, and a cooling method thereof.

BACKGROUND ART

A conventional laser apparatus generates a laser beam mainly by converting an electric energy into a form of light (turns on a lamp) or an electric discharge to pump a laser medium. It is known that such method comprises a plurality of energy conversion processes and having a low-energy efficiency (not more than a few percent). The reason may include the fact that an electric energy, which has originally high quality, is converted into light through a low-efficient energy conversion in use.

In this regard, solar light can be used as a light source for laser oscillation without using the low-efficient electric-to-light conversion process. Only the principle of a solar light pumped laser has hitherto been studied mainly in research institutes and laboratories of universities. However, studies about a solar light pumped laser aiming at practical development or practical use level has been scarcely done.

Since the conventional solar light pumped laser apparatus pumps a laser medium by focusing solar light on the laser medium by using a reflection mirror or a lens, the apparatus cannot be made large and hence, there is a difficulty in the industrial application thereof. Furthermore, though various experimental studies have been reported, an imitation solar light sources are used in all the reported solar light pumped lasers with high efficiencies of more than 10 percent. Accordingly, it can be said that there has not been performed any studies about laser oscillation using actual solar light as a pumping light source. In order to utilize the solar light as a pumping light source for the practical use of the solar light pumped laser, the energy density of the solar light needs to be enhanced so as to generate a population inversion at a laser oscillation level. In this case, there is a problem in that the configuration of the reflection mirror and the lens for enhancing the energy density of the solar light must be examined.

On the other hand, literatures related to the solar light pumped laser, for example, Japanese Patent Laid-Open No. 2003-188441 (Patent Literature 1), Japanese Patent Laid-Open No. 2003-012569 (Patent Literature 2), Japanese Patent Laid-Open No. 2002-255501 (Patent Literature 3) and Japanese Patent Laid-Open No. H7-240553 (Patent Literature 4), have been known so far. Patent Literature 1 discloses a solar light pumped laser having a structure in which a coolant flows around a laser medium, yet does not disclose at any point of realizing an energy density necessary for highly efficient laser oscillation by using solar light of a low-energy efficiency.

Figure 9:
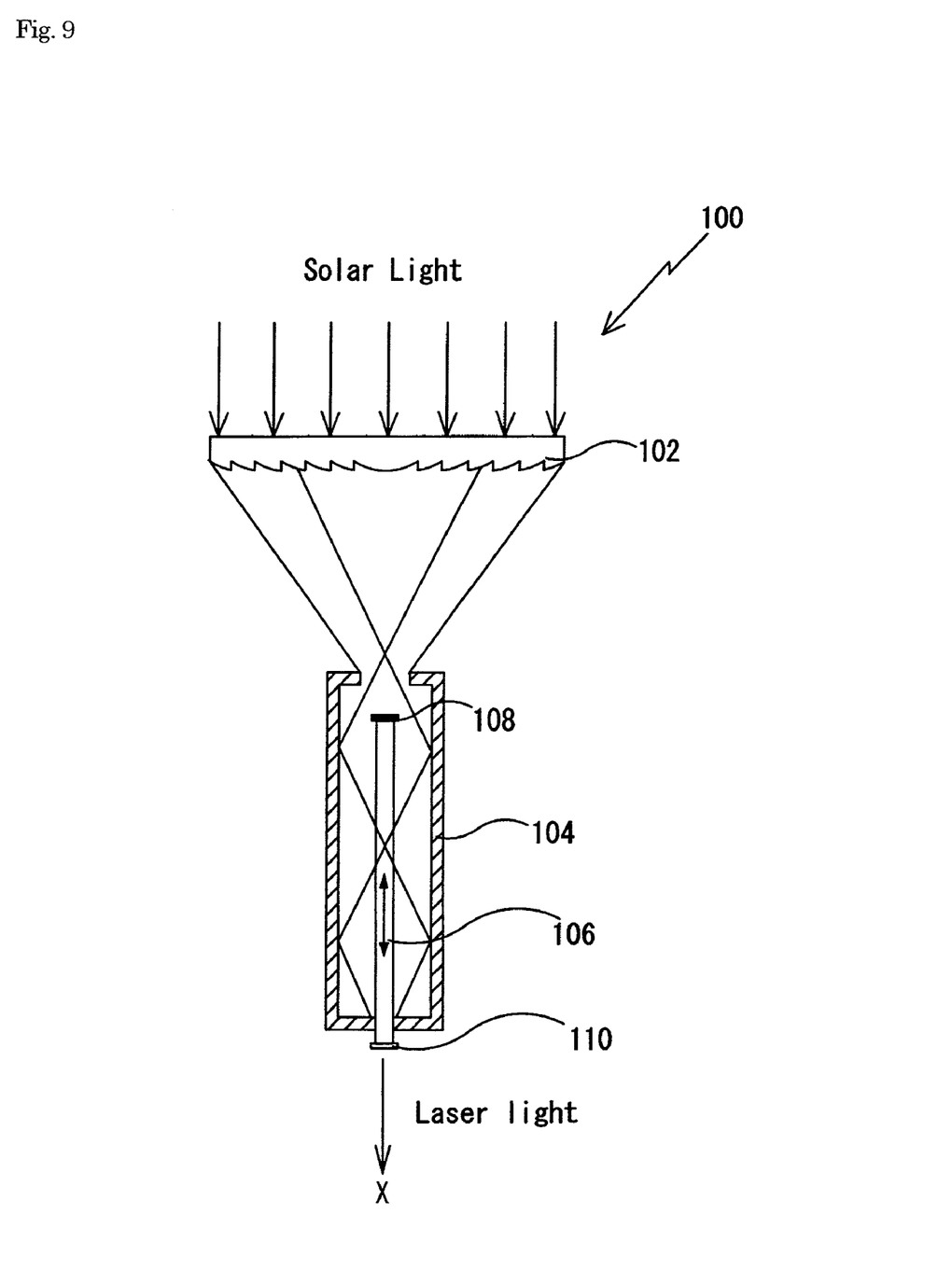
FIG. 9 shows the structure of the conventional solar light pumped laser.

FIG. 9 depicts the cross section of the conventional solar light pumped laser that has hitherto been proposed. The solar light pumped laser 100 shown in FIG. 9 comprises in general the Fresnel lens 102, the containing frame 104 provided with the reflection optical system for reflecting solar light focused by the Fresnel lens 102, and the laser medium 106. The total reflection mirror 108 is disposed on one end of the laser medium 106 and the half mirror 110 is disposed on the other end thereof to irradiate a laser beam in a direction indicated by the arrow X. The containing frame 104 retains air as a coolant internally. As shown in FIG. 9, the pumping solar light is entered into the laser medium 106 from one surface thereof. Since the total reflection mirror 108 is disposed on this surface of incidence, the laser medium 106 cannot be pumped efficiently in the traveling direction of the laser beam. Further, in this configuration, a large area ratio of cross sections between the opening of the containing frame 104 into which the solar light is entered and the laser medium 106 cannot be attained, there is an essential restriction in that an upper limit of a power amplification effect from solar light power to a laser beam is limited by this area ratio thereof. Further, solar light is hardly focused by the reflection elements disposed inside the containing frame 104, and irradiated onto the laser medium as scattered light. Accordingly, in this configuration, the laser medium 106 cannot be pumped efficiently in the laser oscillation direction. In addition, since air is used as a coolant, the laser medium is hardly expected to be cool, and this configuration cannot cope with an essential problem of efficiently cooling the laser medium and the Fresnel lens 102 which are served as a focusing optical system.

That is to say, the laser system disclosed by the above prior art uses or simply appropriates a commercially available laser cooling method, and lacks a viewpoint of the practical use of the method for focusing the solar light on the laser medium. Further, the lens and the reflection mirror included in this laser system are inappropriately arranged suitable for the industrial use of the solar light pumped laser. In addition, the laser system employs an asymmetrical optical arrangement in which pumping light propagates in an axial direction of a laser material, and this causes a problem in that homogeneous pumping of the material is difficult, resulting in a low efficiency.

[Patent Literature 1] Japanese Patent Laid-Open No. 2003-188441
[Patent Literature 2] Japanese Patent Laid-Open No. 2003-012569
[Patent Literature 3] Japanese Patent Laid-Open No. 2002-255501
[Patent Literature 4] Japanese Patent Laid-Open No. H7-240553

DISCLOSURE OF INVENTION

Problems to be Solved by the Invention

An object of the present invention is to improve a quality of a renewable energy, more specifically, to provide a more industrially applicable solar light pumped laser performing laser oscillation by efficiently using solar light, a cooling method thereof, and an apparatus using the solar light pumped laser. More specifically, an object of the present invention is to lower the entropy of the solar light, which is an ultimate renewable energy, thereby providing:
(1) a highly efficient solar light pumped laser by efficiently injecting solar light into a laser medium under appropriate conditions for laser oscillation, and
(2) a cooling method of the solar light pumped laser necessary for efficiently injecting the solar light into the laser medium.

Means for Solving the Problems

The present invention has been made through studies based on an idea that use of fluid for a focusing optical system of solar light enables to solve various problems, which is arisen in construction of a large-scale solid structure and includes a particular problem in that a large glass work-piece such as a lens is easily cracked due to the difference between partial expansion rates caused by thermal distortion. That is to say, use of the cooling fluid, particularly water, as a large amount of the lens material which is necessary for focusing optics, enables direct cooling and highly efficient laser oscillation while enabling the cooling facility for the focusing optics to be simplified, thereby being made it possible to construct a large-scale system. Further, the use of the cooling liquid for cooling the focusing optics and the laser medium simultaneously facilitates the construction of the large-scale system and makes it possible to eliminate a structure for cooling the laser medium.

That is to say, according to the present invention, there is provided a solar light pumped laser performing laser oscillation by pumping a laser medium with solar light, the solar light pumped laser including, a laser medium, a container device that supports the laser medium therein, the container device being provided with a focusing optical element for irradiating solar light focused along the laser medium, while retaining cooling liquid in a space between the laser medium and the container device; and a pair of optical reflection elements arranged adjacent to the opposing ends of the laser medium.

According to the present invention, the container device may have a part transmitting solar light therethrough, a cross sectional shape of the part transmitting solar light of the container device and a refractive index of the cooling liquid may provide a focusing optical element in cooperation to pump the laser medium. The cooling liquid may be water, and the focusing optical element may form a water lens using water as an optical medium, and the focusing optical element may be provided with an anti-reflection film formed on an end of the container device. The container device may have an asymmetric shape of a cross section in a direction across the laser medium and may hold a plurality of laser media corresponding to wavelength regions of solar light. The solar light pumped laser may be provided with a separate optical element for focusing solar light separately from the focusing optical element provided in the container device. The laser medium may include a chemical species absorbing a wavelength contained in solar light to generate a population inversion directly or through energy transfer.

The laser medium may be selected from a group consisting of: a ruby ($Cr^{3+}:Al_2O_3$); YAG ($Nd^{3+}:Y_3Al_5O_{12}$); an alexandrite ($Cr^{3+}:BeAl_2O_4$); an emerald ($Cr^{3+}: Be_3Al_2(SiO_3)_6$); a laser medium formed by adding $Cr^{3+}$ and $Nd^{3+}$ to a garnet represented by general formula $A_3B_2C_3O_{12}$, site A being used an element selected from a group consisting of Ga and Al, site B being used an element selected from a group consisting of Ga, Sc and Lu, and site C being used an element selected from a group consisting of Y, Gd, La and Lu; a sapphire ($Ti^{3+}: Al_2O_3$); $Co^{2+}:MgF_2$; $Cr^{3+}:ScBO_3$; $Nd^{3+}:GGG$ ($Gd_3Ga_5O_{12}$); Cr and Nd:GSGG ($Gd_3(GaSc)_5O_{12}$); and a laser medium including a glass material, a laser medium being doped with a lanthanoid element including Ce, Pr, Pm, Sm, Eu, Tb, Dy, Ho, Er, Tm, Yb or Lu and ions thereof, or a laser medium including glass being doped with a transition metal element or an ion of the transition metal element. The asymmetric shape of the solar light pumped laser may be variable in accordance with an incident angle of solar light accompanied by diurnal motion of the sun.

The laser medium according to the present invention may be provided with a center portion and a skirt portion for increasing an incident angle of focused solar light. The center portion of the laser medium may be doped and the skirt portion of the laser medium may be undoped. The dopant concentration of the center portion may be ranging from approximately 0.1 atom percent to approximately 4.0 atom percent.

According to the second aspect of the present invention, there is provided a cooling method for a solar light pumped laser performing laser oscillation by pumping a laser medium with solar light, the cooling method comprising the steps of: retaining a cooling liquid in a space between the laser medium and a container device with a focusing optical element and focusing solar light on the laser medium.

The cooling liquid may cool the container device and the focusing optical element simultaneously. The container device may be provided with a part transmitting solar light therethrough, and a cross sectional shape of the part transmitting the solar light and a refractive index of the cooling liquid may form the concentrating optical element in cooperation. A solid body including a chemical species may be used as the laser medium, the chemical species generating a population inversion by absorbing a wavelength contained in solar light.

ADVANTAGES OF THE INVENTION

According to the present invention, a solar light pumped laser for pumping a laser medium with solar light which is efficient and applicable to a large-scale device may be provided.

Further according to the present invention, a cooling method of the solar light pumped laser capable of cooling and focusing solar light simultaneously may be provided.

BEST MODE FOR CARRYING OUT THE INVENTION

Figure 1:
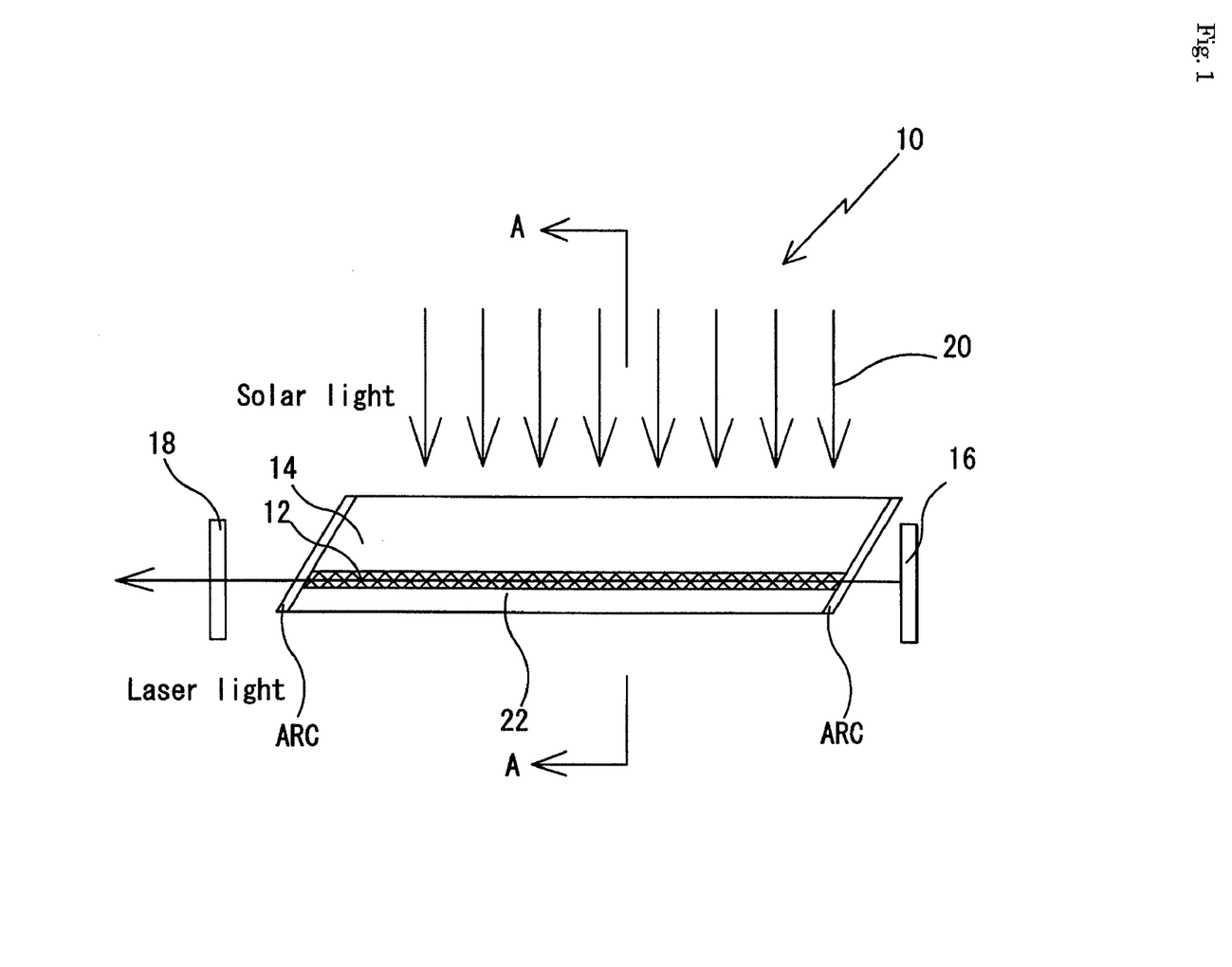
FIG. 1 is the side view of the solar light pumped laser according to the present invention.

The present invention will be described hereunder with referring to embodiments shown in the accompanied drawings, however, the present invention is not limited by the specific embodiments shown in the drawings. FIG. 1 depicts the schematic view of the configuration of the solar light pumped laser 10 according to the present invention. The solar light pumped laser 10 according to the present invention includes a laser medium 12, the container device 14 supporting the laser medium 12, the total reflection mirror 16 disposed on one end of the laser medium 12, and a half mirror 18 disposed on the other end. The container device 14 further includes the reflection elements 22 focusing solar light 20 onto the laser medium 12, and pump the laser medium 12 optically to generate a population inversion.

Both ends of the container device 14 shown in FIG. 1 give a Brewster angle specified by a material forming each end of the container device 14 and air or the laser medium 12 and air when the laser medium 12 is directly exposed at each end of the container device 14. In addition, when the may not be requested, the ends of other angles may be possible. The container device 14 may be formed integrally with the laser medium 12, or the laser medium 12 may be fixed on each end of the container device 14 by using an appropriate flange, O ring or the like. Further, according to the embodiment shown in FIG. 1, the end surfaces of the container device are coated with an ARC (anti-reflection coating) to reduce the reflection of a generated laser beam. In addition, the ARC may be formed as a dielectric multilayer coating or a metal deposition film. The ARC may be omitted in the present invention where the container device 14 without an anti-reflection treatment may be accepted. The container device 14 is filled with a cooling liquid such as water to cool the laser medium 12 accompanying with laser oscillation and to prevent the laser medium from being damaged by a thermal shock. The cross sectional shape of the container device may be a circular shape, an elliptic shape or a parabolic shape. When the container device having a circular cross sectional shape is adopted, the laser medium is disposed on a position in accordance with the curvature of the container device and the reflective index of the cooling medium. Further, when the container device having an elliptic cross sectional shape is adopted, the laser medium may be disposed on one focal point to focus the solar light on the other focal point. These shapes may be used in combination to focus the solar light onto the laser medium.

The cooling liquid other than water available in the present invention includes, for example, alcohols such as amyl alcohol, aryl alcohol, isoamyl alcohol, isobutyl alcohol, isopropyl alcohol, undecanol, ethanol, 2-ethyl butanol, 2-ethyl hexanol, 2-octanol, n-octanol, glycydol, cyclohexanol, 3,5-dimethyl-1-hexyn-3-ol, n-decanol, tetrahydrofurfryl alcohol, alpha-terpineol, neopentyl alcohol, nonanol, fuser oil, butanol, furfryl alcohol, propargyl alcohol, propanol, hexanol, heptanol, benzyl alcohol, pentanol, methanol, methylcyclohexanol, 2-methyl-1-butanol, 3-methyl-2-butanol, 3-methyl-1-butyne-3-ol, 4-methyl-2-pentanol and 3-methyl-1-pentin-3-ol.

The above solvent further includes, ether and/or acetal solvents such as anisole, ethyl isoamyl ether, ethyl-t-butyl ether, ethyl benzyl ether, epoxy butane, crown ethers, crezyl methyl ether, di-isoamyl ether, di-isopropyl ether, diethyl acetal, diethyl ether, dioxane, 1,8-cineol, diphenyl ether, dibutyl ether, dipropyl ether, dibenzyl ether, dimethyl ether, tetrahydropyrane, tetrahydrofuran, trioxane, bis (2-chloroethyl) ether, phenetole, butyl phenyl ether, furan, furfural, methylal, methyl-t-butyl ether, methyl furan and monochlorodiethyl ether.

The above solvent also available herein further includes, ketone and/or aldehyde solvents such as acetyl aceton, acetoaldehyde, acetophenone, aceton, isohoron, ethyl-n-butyl ketone, diaceton alcohol, di-isobutyl ketone, di-isopropytl ketone, diethyl ketone, cyclohexanone, di-n-propyl ketone, horon, mesityl oxide, methyl-n-amyl ketone, methylisobutyl ketone, methylethyl ketone, methylcyclohexanone, methyl-n-butyl ketone, methyl-n-propyl ketone, methyl-n-hexacyl ketone and methyl-n-heptyl ketone.

The above solvent further includes, multivalent alcohols such as ethylene glycol, ethylene glycol dibutyl ether, ethylene glycol diacetate, ethylene glycol dibutyl ether, ethylene glycol dimethyl ether, ethylene glycol monoacetate, ethylene glycol monoisopropyl ether, ethylene glycol monoethyl ether, ethylene glycol monoethyl ether acetate, ethylene glycol monophenyl ether, ethylene glycol monobutyl ether, ethylene glycol monobutyl ether acetate, ethylene glycol monohexyl ether, ethylene glycol monomethyl ether, ethylene glycol monomethyl ether acetate, ethylene glycol monomethoxy methyl ether, ethylene chlorohydrone, 1,3-octylene glycol, glycerin, glycerin-1,3-diacetate, glycerindialkyl ether, glycerin fatty acid ether, glycerin triacetate, glycerin triraurate, glycerin monoacetate, 2-chloro-1,3-propahnediol, 3-chloro-1,2-propanediol, diethylene glycol, diethylene glycol ethylmethyl ether, polypropylene glycol and derivatives thereof.

The above solvent further includes, in response to particular requirements, carboxyl acid derivatives such as iso-valeic acid, iso-butyric acid, itaconic acid, 2-ethyl hexaconic acid, 2-ethyl acetic acid, oleic acid, caprylic acid, caproic acid, formic acid, valeic acid, acetic acid, lactic acid, pivaric acid, and propionic acid; phenols such as ethyl phenol, octyl phenol, catechol, quaiacol, xylenol, p-cumylphenol, cresol, dodecyl phenol, naphtol, nonyl phenol, phenol, benzyl phenol, and p-methoxyethyl phenol; nitrogen-containing compounds such as acetonitrile, aceton cyanohydrin, aniline, arylamine, amylamine, isoquinoline, isobutylamine, isopropanolamines, isopropylamine, imidasol, N-ethylethanolamine, 2-ethylhexylamine, N-ethylmorpholin, ethylenediamine, caprolactam, quinoline, chloroaniline, ethyl cyanoacetate, diamylamine, isobutylamine, diisopropylamine, diisopropylethylamine, diaethanolamine, N,N-dethylaniline, diethylamine, diethylbenzylamine, diethylen triamine, dioctylamine, cyclohexylamine, triethylamine, triamylamine, trioctylamine, triethanolamine, triethylamine, trioctylamine, tri-n-butylamine, tripropylamine, trimethylamine, toluidine, nitroanisole, picorin, pyperadine, pyradine, pyrridine, pyrrolidine, N-phenylmorpholine, morpholine, butylamine, heptylamine and lutidine; acid halides such as halloganated carboxylic acid; sulfur-containing compound solvents; fluoride solvents such as tetrafluoropropionic acid; polymeric compounds such as silicon oil; liquid ammonia; liquid carbonic acid; oxy-phosphorus chloride; and mixtures of some of these solvents in any amounts.

In the present invention, since the container device 14 has a function for focusing solar light onto the laser medium 12 and retains a cooling liquid therein, the container device 14 may be cooled by the cooling liquid together with the laser medium. Water is preferably used as the cooling liquid from viewpoints of the cost and the operability. Further, the cooling medium may transmit solar light while being enclosed or flown in the container device having a shape capable of focusing the solar light onto the laser medium.

Further, a light emitting diode or a semiconductor laser generating a laser beam with corresponding wavelength to a laser wavelength may be used in the present invention so as to appropriately trigger laser oscillation. Furthermore, in order to trigger laser oscillation, a material having an optical Kerr effect and a polarizing plate for polarizing a polarization angle in response to an external electrical trigger may be used. Further, an oversaturated dye may be used to trigger laser oscillation in Q switch mode.

Any laser medium may be used in the present invention without any limitation on a shape thereof, a state thereof, e.g., solid or liquid, and a chemical composition thereof, as far as it is capable of efficiently absorbing a wavelength within the range of a wavelength contained in solar light to excite a laser active species and to generate a population inversion. According to a preferred embodiment of the present invention, the laser medium may be formed into an optically transparent rod having a diameter of several millimeters to several centimeters. The laser medium available in the present invention includes, such as for example, a ruby ($Cr^{3+}:Al_2O_3$); YAG ($Nd^{3+}:Y_3Al_5O_{12}$); an alexandrite ($Cr^{3+}:BeAl_2O_4$); an emerald ($Cr^{3+}:Be_3Al_2(SiO_3)_6$); a laser medium formed by adding $Cr^{3+}$ and $Nd^{3+}$ to a so-called garnet represented by general formula $A_3B_2C_3O_{12}$, where site A thereof is used an element selected from the group consisting of Ga and Al in used, site B thereof is used an element selected from the group consisting of Ga, Sc and Lu in used, and site C thereof is used an element selected from the group consisting of Y, Gd, La and Lu is used; a sapphire ($Ti^{3+}:Al_2O_3$); $Co^{2+}:MgF_2$; $Cr^{3+}:ScBO_3$; $Nd^{3+}:GGG$ ($Gd_3Ga_5O_{12}$), Cr and Nd:GSGG ($Gd_3(GaSc)_5O_{12}$). Any laser medium may be used as far as it is capable of forming an appropriate absorption band within the range of solar light due to crystal field thereof. Further, a laser medium including, for example, a glass being doped by other rare-earth element, for example, lanthanoid element including Ce, Pr, Pm, Sm, Eu, Tb, Dy, Ho, Er, Tm, Yb or Lu, ions thereof, a transition metal element, or a transition metal ion, and has different characteristics may be used for the laser medium 12.

The reflection mirror 16 may be constructed by using a mirror with a metal coating such as AL deposition; a mirror including a coating by which the laser oscillation wavelength may be selectively reflected prepared by a dielectric multilayer coating; or a prism system which uses the total reflection thereof. The half mirror 18 may preferably be a mirror having a transmittance within the range from approximately 10 percent to approximately 90 percent coated with a dielectric multilayer film. Further, any known coating including a dielectric multilayer film coating or a metal coating may be used for the reflection elements 22 available in the present invention.

Figure 2:
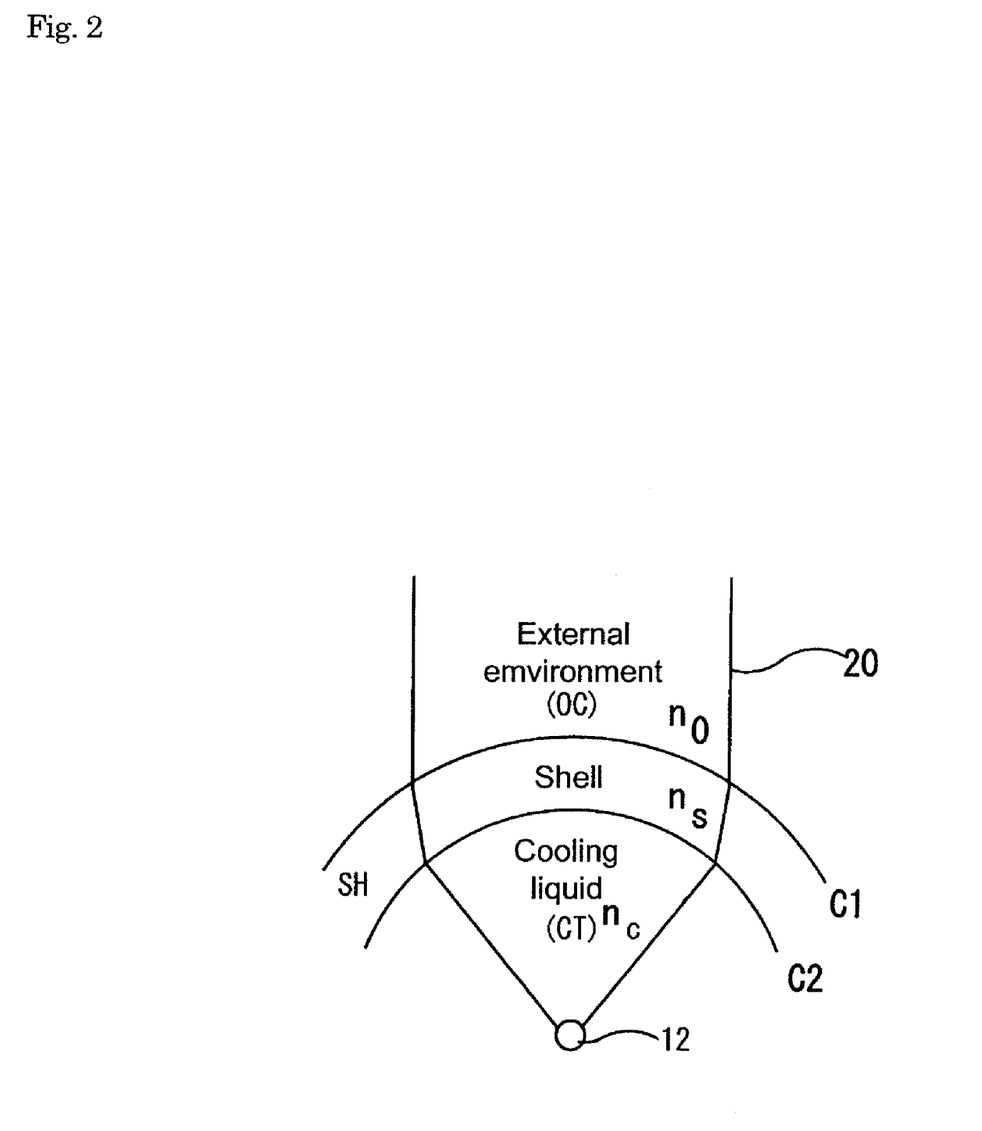
FIG. 2 is the view of assistance in explaining the function of the focusing optical element according to the present invention.

FIG. 2 illustrates the functions constituting the focusing optical system provided in the container device 14 according to the present invention. As shown in FIG. 2, the focusing optical system according to the present invention separates the laser medium 12 from an external environment OC by a shell SH. The external environment OC is usually air or vacuum and has a refractive index of $n_o$. The shell SH is formed as the wall of the container device 14 and a concave lens or a convex lens formed separately from the wall of the container device 14, has a refractive index of $n_s$ in accordance with a material used such that the interface C1, C2 are provided. Further, a space between the laser medium 12 and the shell SH is filled with the cooling liquid CT, and the cooling liquid CT gives a refractive index of $n_c$. The light changes the pathway thereof at the boundary interface having different refractive indexes. In the present invention, in order to focus the solar light entered from the external environment OC into the laser medium 12, the use of the refractive index of the shell SH and the refractive index of the cooling liquid CT in cooperation enables a flexible focusing of solar light toward laser medium 12. For example, the shell SH may be formed into a concave lens or a convex lens, or may be formed by a combination of a plane glass plate and a curved glass plate to form a closed space in which an optical medium having a refractive index of $n_z$ is filled.

Figure 3:
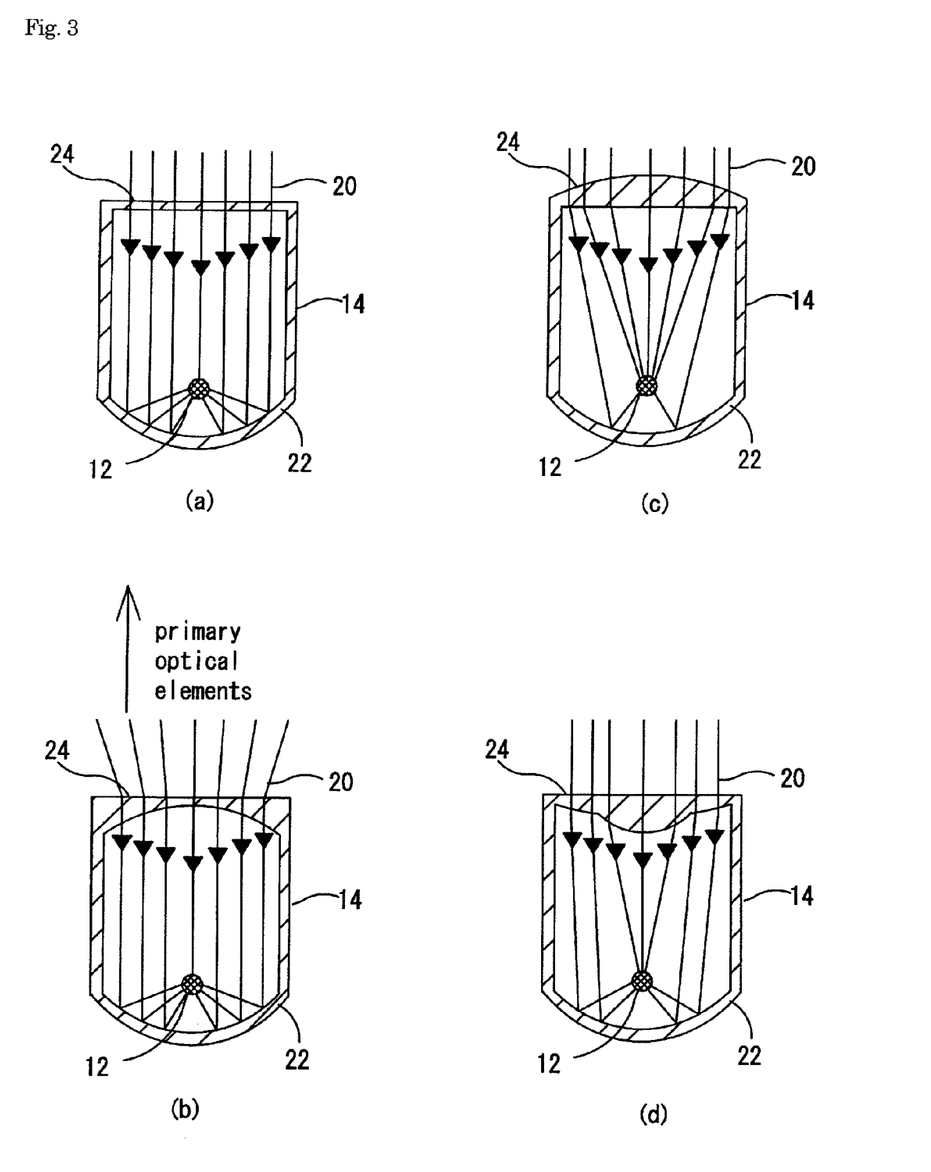
FIG. 3 is the cross section of the embodiment of the solar light pumped laser according to the present invention.

FIG. 3 shows the cross section structure of the solar light pumped laser 10 according to the present invention along with the line A-A in FIG. 1. In the present invention, as shown in FIG. 3(*a*), the container device 14 according to the present invention receives solar light 20 and has an asymmetric shape in relation to the laser medium 12 which is provided with the reflection elements 22 formed into a parabolic shape on the surface opposing to the surface of incidence for the solar light, and the container device 14 provides a focusing optical element. Further, the laser medium 12 is aligned on the focal point of the parabolic surface, and focusing the solar light 20 entered from the entrance window 24 as highly focused parallel light by, for example, a separately provided reflection mirror. The laser medium that absorbed the solar light 20 to generate a population inversion oscillates a laser beam in the direction perpendicular to the plane of the drawing. FIG. 3(*b*) shows another embodiment of the container device 14 according to the present invention. In the embodiment shown in FIG. 3(*b*), the entrance window 24 is formed into a cylindrical concave lens, and the internal surface thereof is cooled by a cooling medium. According to the present invention, quartz glass, borosilicate glass, heat-resisting glass and tempered glass may be used as the entrance window 24. In the embodiment shown in FIG. 3(*b*), the solar light 20 is focused by a primary pumping optical system (not shown) having a large area and entering into the entrance window 24. The incident solar light 20 is converted into parallel light by the entrance window 24 and then focused by the reflection elements 22 to pump the laser medium 12 at a higher energy density than that shown in FIG. 3(*a*).

Further, FIG. 3(*c*) shows the embodiment of forming the entrance window 24 into a cylindrical convex lens, and having a structure in which light is first directly focused onto the laser medium 12 and the light which has passed through the laser medium 12 is focused onto the laser medium 12 again. Furthermore, FIG. 3(*d*) shows an embodiment forming the entrance window 24 into a non-spherical lens. In the embodiment shown in FIG. 3(*d*), a plurality of curvatures are given to the entrance window 24 in accordance with differences between optical paths of light directly focused onto the laser medium and light focused after being reflected by the reflection elements 22.

Figure 4:
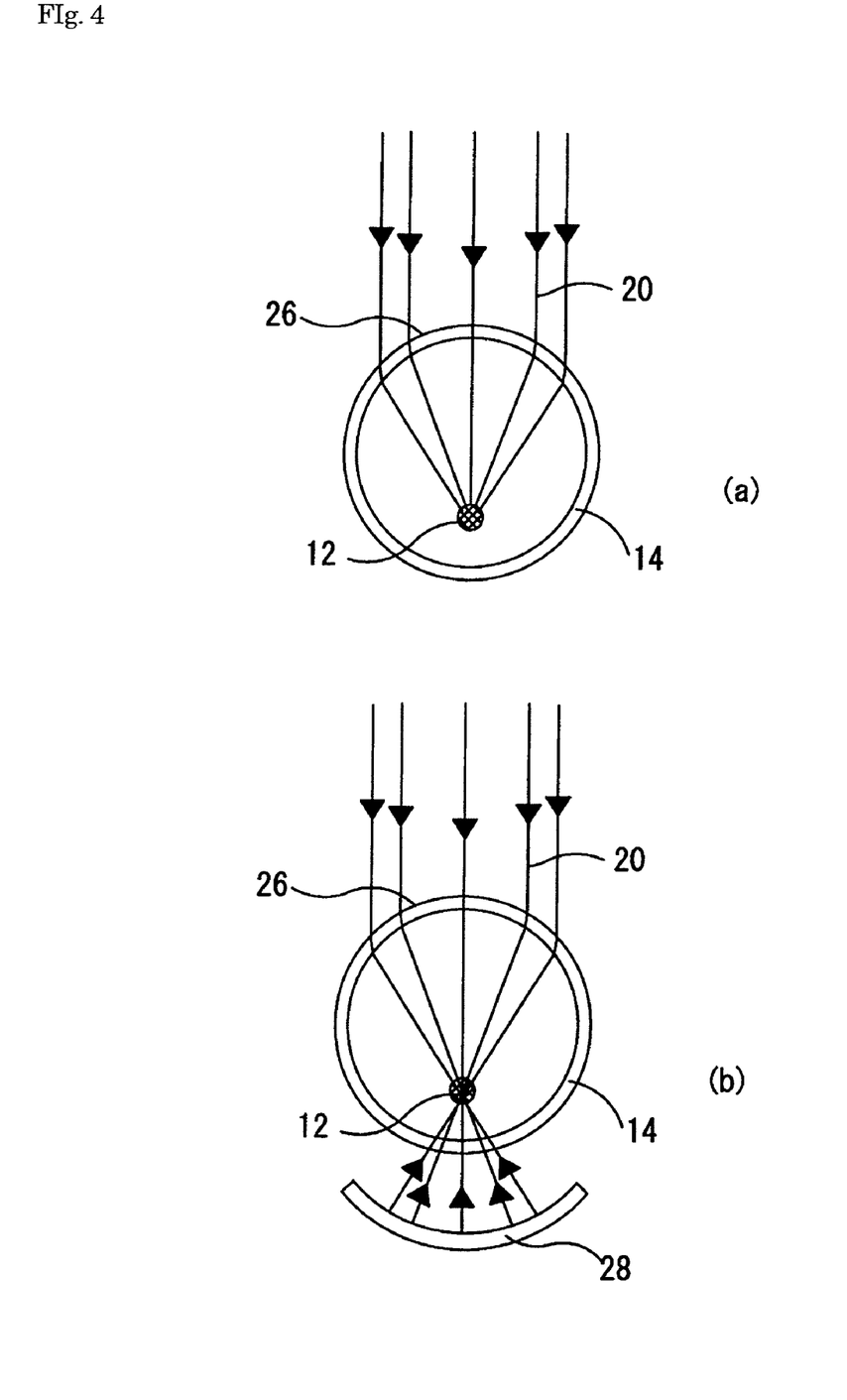
FIG. 4 is the cross section of another embodiment of the solar light pumped laser according to the present invention.

FIG. 4 shows the still another embodiment of the solar light pumped laser 10 according to the present invention. Referring to FIG. 4, in the container device 14, the part of the container device 14 into which solar light is entered and the refractive index of the cooling liquid form a focusing lens in cooperation. In the embodiment shown in FIG. 4(*a*), the container device 14 is formed into a cylindrical shape and the solar light that has been converted into parallel light is entered from the surface of incidence 26. The surface of incidence 26 has a curved surface and functions as a focusing lens together with a liquid functioning as an optical medium to focus the solar light 20 onto the laser medium 12. Further, in the embodiment shown in FIG. 4(*b*), the reflection element 28 is disposed on a position opposed to the surface of incidence 26 with the laser medium 12 in the container device 14 sandwiched therebetween, and reflects the solar light transmitted through the laser medium 12 toward the laser medium 12 again. Also in the embodiment shown in FIG. 4, the container device 14 retains the cooling liquid internally to make it possible for cooling the laser medium 12 and the optical elements having a focusing function simultaneously.

As described hereinbefore, since cooling of the laser medium and the focusing optical element in the present invention is possible to subject simultaneously, the solar light pumped laser 10 is capable of constructing into a large-scale system without causing peculiar problems in dependence on the size of the solar light pumped laser 10, i.e., problems of precision and strength of the lens system and a cooling mechanism due to increase of an area. Further, in the present invention, the surface of incidence 26 is not constructed integrally with the wall of the container device 14 having a convex surface, but may be formed into a cylindrical concave lens attached integrally with or separately from the container device 14. In these case also, the cylindrical concave lens is cooled directly by the cooling liquid. Further, when water is used as the cooling liquid, the cooling liquid has an effect of cleaning the focusing optical element such as the surface of incidence 26, and makes it possible for the long-term use of the solar light pumped laser 10 with maintenance free in a rigorous environment such as desert.

Figure 5:
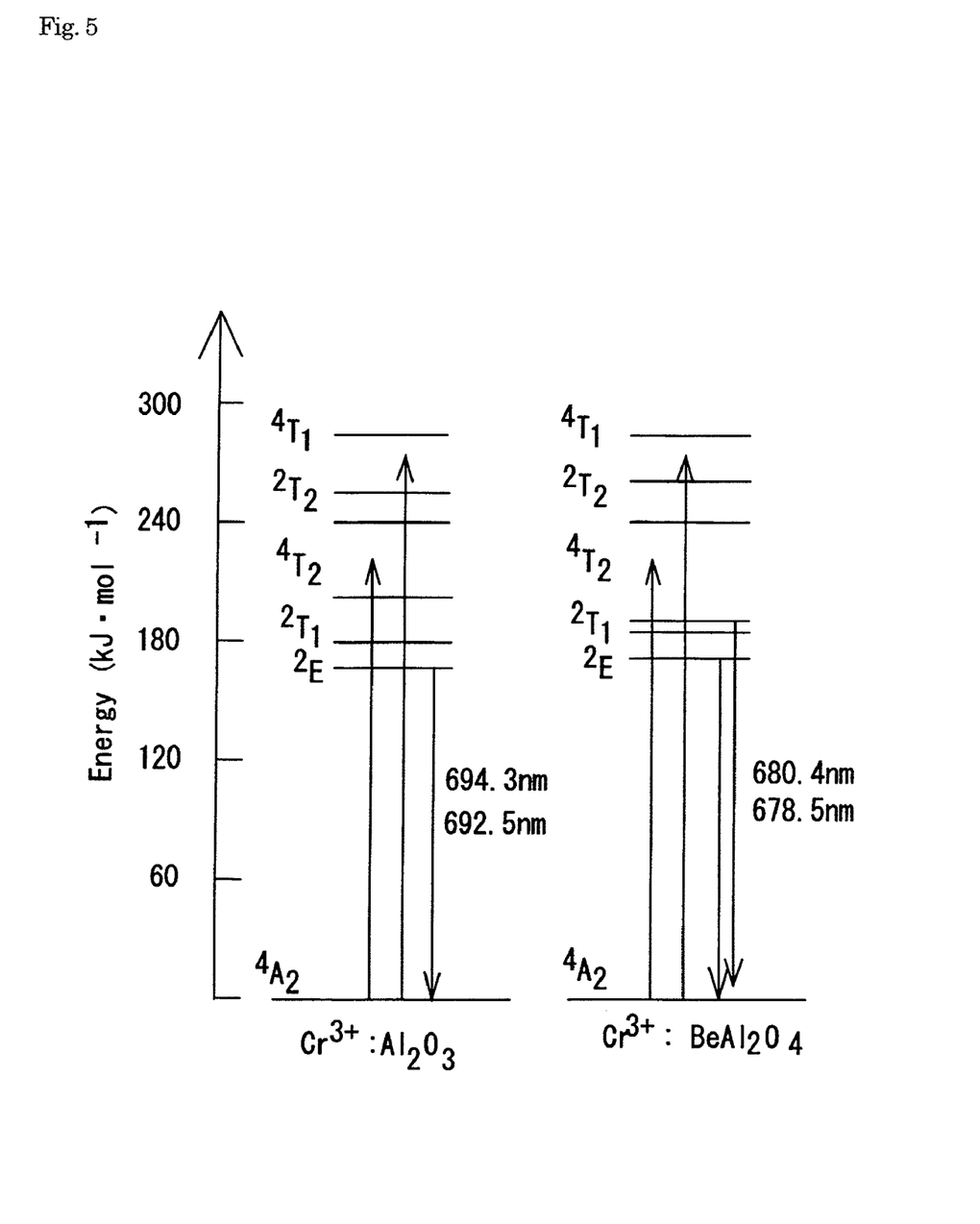
FIG. 5 illustrates the correlation of the energy levels of the laser media available in the present invention.

FIG. 5 illustrates energy levels of crystal fields of a ruby and an alexandrite, i.e., laser media available for the solar light pumped laser 10 according to the present invention. In addition, laser medium available in the present invention is not limited to those shown in FIG. 5 as far as it is capable of absorbing light having wavelengths of approximately 400 nm to approximately 700 nm, which is contained in the solar light, to generate a population inversion. Referring to FIG. 5, the energy levels of the crystal fields of the ruby and the alexandrite are resembled to each other, and energetically have energy levels of, for example, a $^2E$ level, a $^2T_1$ level, a $^4T_2$ band, a $^2T_2$ level and $^4T_1$ band from the lowest order. Among these bands, the $^4T_2$ band and the $^4T_1$ band, which are optically allowable level from a $^4A_2$ level in the ground state, form a U band and a Y band for giving the maximum absorption in the vicinities of approximately 550 nm and approximately 410 nm, respectively.

The population inversion is created through the non-radiative transition from the excited level to the optically forbidden level of $^2E$ level, or in the case of alexandrite $^2E$ level and $^4T_2$ level, respectively. Although the $^2E$ to $^4A_2$ transition is optically forbidden, the symmetrical change thereof due to phonon coupling leads the transition to be Vibronic-allowable, which enables laser oscillation. On the other hand, for the alexandrite, the $^2E$ to $^4A_2$ transition and $^4T_2$ to $^4A_2$ transition give a population inversion in which laser oscillation is possible. Among them, the $^2E$ to $^4A_2$ transition is Vibronic-allowable, however, the $^4T_2$ to $^4A_2$ transition is optically allowable. Therefore, it is possible for performing high-intensity laser oscillation. In the present invention, laser media other than the ruby and the alexandrite may be selected without particular limitation in consideration of laser oscillation efficiencies as far as the laser media have crystal fields and energy levels similar to the ruby and the alexandrite. Further, in the present invention, a plurality of different laser media may be disposed in the container device 14 and a wavelength selection means for focusing a most appropriate wavelength corresponding to the plurality of laser media onto the corresponding laser media to pump the plurality of laser media. Furthermore, when the solar light pumped laser according to the present invention is used in a space outside the atmosphere of the earth, the laser medium needs not to be pumped in a visible light region ranging from 400 to 700 nm contained on the ground and, in the present invention, a laser medium capable of absorbing wavelengths in the range from an X-ray region to an infrared region to generate a population inversion may be used.

Figure 6:
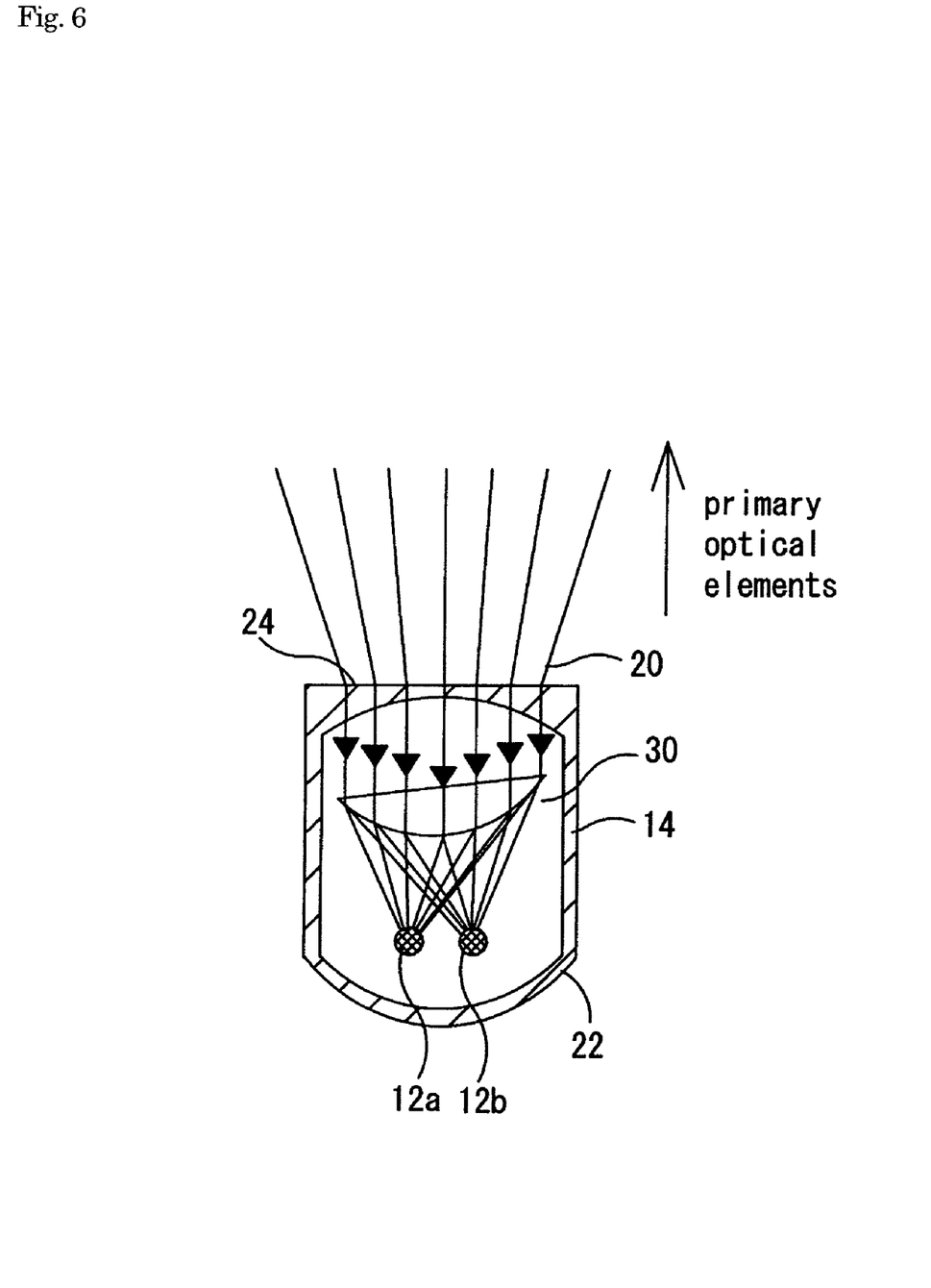
FIG. 6 shows still another embodiment of the solar light pumped laser according to the present invention.

FIG. 6 shows further another embodiment of the solar light pumped laser according to the present invention. In the embodiment shown in FIG. 6, the plurality of laser media 12a and 12b performing laser oscillation and having different wavelengths in accordance with absorption of different wavelengths are used. Further, an optical element 30 which is slanted relative to the laser media 12a and 12b is disposed below the entrance window 24 where the cooling liquid for cooling the optical element 30 is retained and is cooled by the cooling liquid. The refractive index of the cooling liquid is large relative to a component having a short wavelength and is small relative to a component having a long wavelength among wavelengths contained in the solar light 20. Accordingly, the slant of the optical element 30 as shown in FIG. 6 makes so-called chromatic aberration increase so that the corresponding solar light beams are focused onto the laser media 12a and 12b, respectively. In the embodiment shown in FIG. 6, an absorption wavelength (approximately 406 nm) corresponding to a Y band of $Cr^{3+}:Al_2O_3$ (ruby) is focused on the laser medium 12a, and a light beam of approximately 1,300 nm corresponding to the maximum absorption of $Co^{2+}:MgF_2$ is focused on the laser medium 12b. Even in the embodiment shown in FIG. 6, the optical element 30 is supported in the cooling liquid so as to be cooled simultaneously. Further, improvement of the conversion efficiency and efficiently use of solar light may be possible. Furthermore, in the present invention, the container device 14 or the focusing optical element may be driven by a focusing optical system (not shown). In the embodiment shown in FIG. 6, the container device 14 may be provided with a system for rotating the optical element 30 in accordance with the diurnal motion of the sun by, for example, disposing stepping motors driven by a solar battery on both ends of the optical element 30 to rotate thereof in the horizontal direction on the plane of the drawing.

A study has been made by simulating about output of the solar light pumped laser on the basis of the above structure. An $Nd^{3+}:YAG$ rod having a diameter of 1 mm was used as a laser medium, and it was found that the width of a light focusing system of the solar light to give a sufficient power density for generating a population inversion necessary for the solar light pumped laser of the structure shown in FIG. 4 to perform laser oscillation was 10 cm. A laser oscillation efficiency of $Nd^{3+}:YAG$ was used to simulate the efficiency thereof on conditions in that a cylindrical convex lens having a diameter of 10 cm was used for the solar light pumped laser to focus light and the length of the laser medium of the solar light pumped laser was 1 m. As a result, the light-to-light conversion efficiency of the solar light pumped laser was estimated to be approximately 30 percent. It was theoretically demonstrated by using this value to convert from inputted solar power that a laser output corresponding to tens of Watts was possible to generate.

Figure 7:
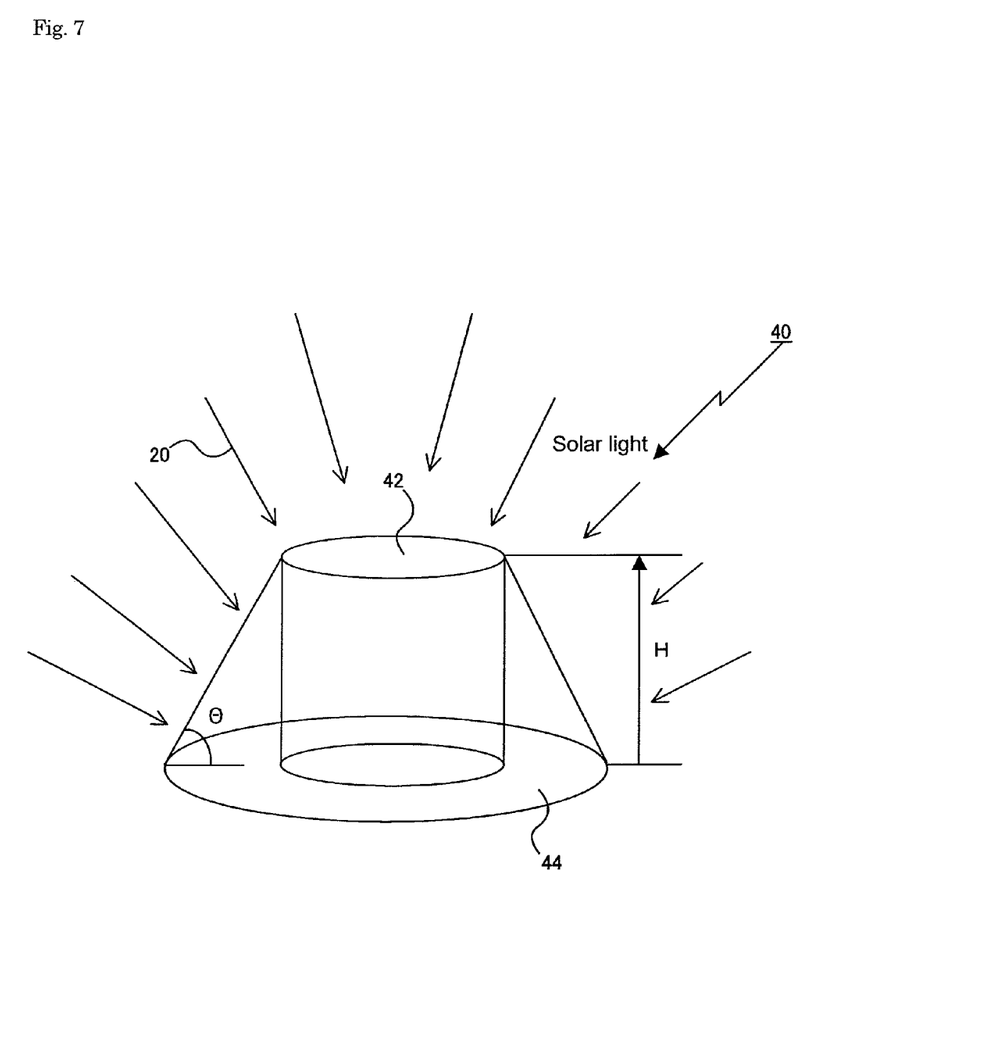
FIG. 7 shows the embodiment of the laser medium available in the solar light pumped laser according to the present invention.

FIG. 7 shows another embodiment of the laser medium having another shape available in the present invention. The laser medium 40 shown in FIG. 7 has a truncated conical shape and has a composition in which a dopant concentration in the columnar portion 42 at the center thereof is different from that in the skirt portion 44. In the embodiment shown in FIG. 7, solar light 20 is focused from a focusing lens (not shown) of r=1,000 mm on the basis of assumption that F=0.5. The columnar portion 42 is formed of doped Nd:YAG, and the dopant concentration thereof is from 0.1 atom percent to 4.0 atom percent in relation with Cr and Nd. The above-described non-cylindrical laser medium used in the present invention may be manufactured by a combination of any known methods including a method of forming portions having different dopant concentrations by hydrothermal synthesis, respectively, followed by adhering the portions to each other with a thermosetting silicon resin, a method of forming the portions by repeating hydrothermal synthesis for a plurality of times at different doping concentrations, a thermal diffusion bonding method, and annealing after ion implantation in accordance with a size of a laser medium. On the other hand, the skirt portion 44 is formed of undoped pure YAG, and is slanted with an angle θ (theta) regarding to the height H of the laser medium 40. According to the embodiment shown in FIG. 7, it was found that the angle θ (theta) within the range from approximately 15 degrees to approximately 60 degrees, more preferably within the range from approximately 20 degrees to approximately 40 degrees, increasing the absorption ratio and the power volume density of the solar light 20 to approximately six times. Further, in the embodiment of the laser medium shown in FIG. 7, an incident angle of solar light 20 focused from a focusing optical element (not shown) may be an angle as close to right angle as possible, and further, laser oscillations may be generate in the vicinity of the center of the laser medium 40 so that a solar light laser is possible to oscillate more efficiently.

Figure 8:
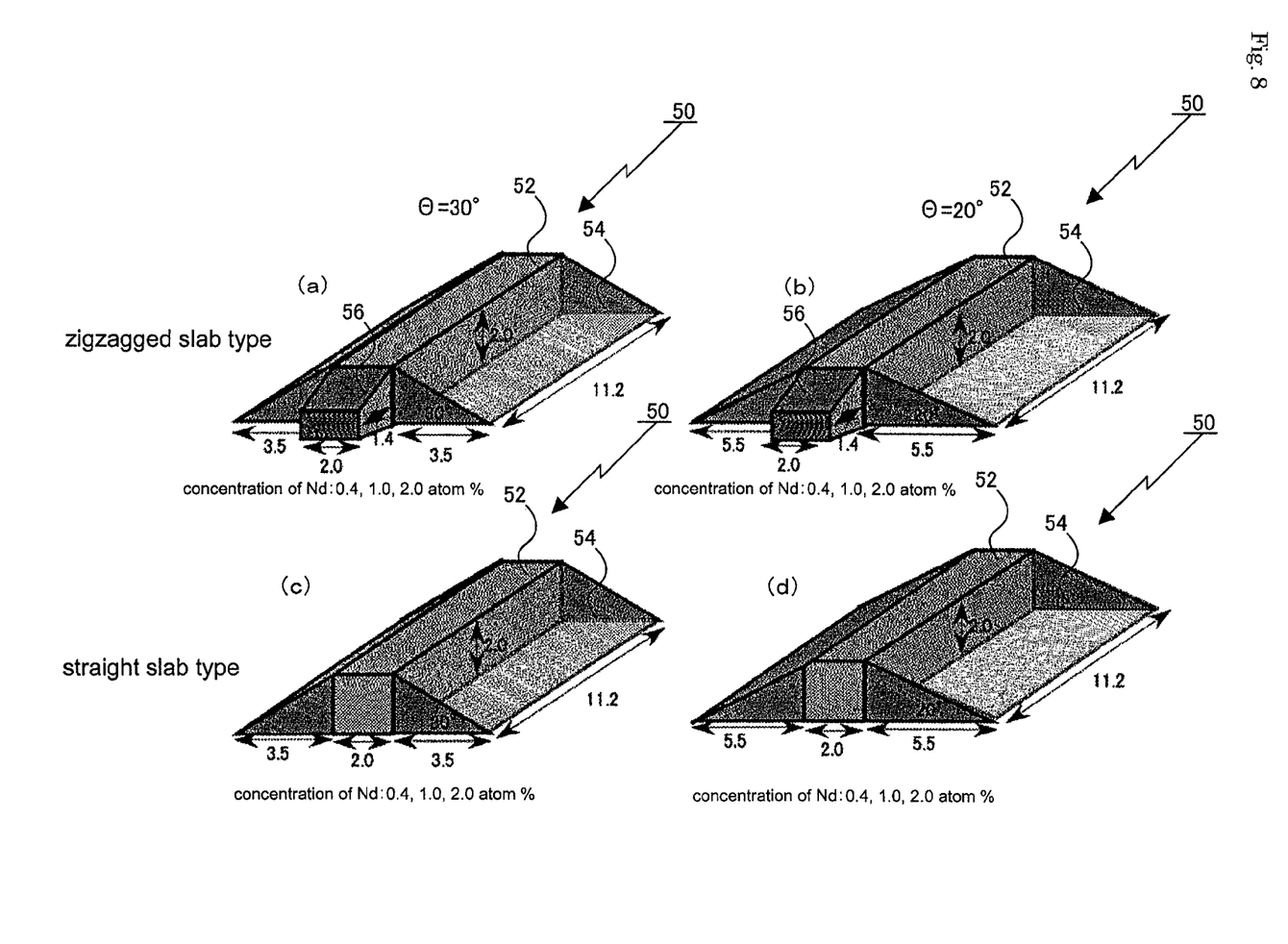
FIG. 8 shows another embodiment of the laser medium available in the solar light pumped laser according to the present invention.

FIG. 8 shows further another embodiment of the laser medium 50 available in the present invention. The laser medium 50 shown in FIG. 8 consists of the center slab 52 and the skirt portion 54 in a similar way as described in FIG. 7. The center slab 52 is formed of doped Nd:YAG and the skirt portion 54 is formed of undoped YAG. In FIGS. 8(a) and 8(b), projections 56 are disposed on both ends of the center slab 52 to make a characteristic of laser oscillation be a zigzagged slab type. In FIGS. 8(c) and 8(d), the characteristic of laser oscillation is controlled to be a straight slab type by modifying the shapes of the ends of the laser media 50. In addition, in the four embodiments of the laser medium 50 shown in FIG. 8, the $Nd^{3+}$ doping concentration in Nd:YAG of the center slab 52 is changed to 0.4 atom percent, 1.0 atom percent and 2.0 atom percent, and a ray-trace simulations were conducted for the laser media 50 of 12 types in total assuming that the solar light 20 is irradiated from a spherical lens of F=1.0 having a diameter of 1,000 mm onto the laser medium 50 having a length of 11.2 mm, a full width of 9 mm and a height of 2.0 mm. As a result, similar to the case shown in FIG. 7, the absorption efficiency of the solar light was increased to approximately six times when the skirt portion 54 had an angle within the range from 20 degrees to 60 degrees, more preferably within the range from 20 degrees to 50 degrees, furthermore preferably within the range from 20 degrees to 40 degrees, and it was found that a more efficient laser medium for the solar light pumped laser could be provided. In addition, the absorption characteristics of the laser medium 50 shown in FIG. 9 are different but the absorption efficiency thereof is improved in almost the same level in cases where the solar light is entered from a narrow part and a wide part.

The solar light pumped laser according to the present invention may be used in an oxygen gas generator employing photolysis, a laser power transmitter, a laser-driven vehicle, a spacecraft and a ship, a removal device for removing environmentally harmful substances by photolysis, and a laser processing machine. The solar light pumped laser enables to construct a lightweight system and to perform laser oscillation by using a renewable energy. Accordingly, since another energy for laser oscillation needs not to be used, the solar light pumped laser may be mounted in, for example, a spacecraft and applied to high-density optical communication equipment for performing communication between artificial satellites or planets, a driving device or the like.

INDUSTRIAL APPLICABILITY

The solar light pumped laser according to the present invention is capable of cooling the laser medium and the solar light focusing optical system simultaneously. Accordingly, the solar light pumped laser is capable of easily coping with the increase of an equipment scale, reducing costs for maintenance of a laser medium and manufacturing of a focusing optical system, and increasing an output accompanied with improvement of a light focusing efficiency. Moreover, the solar light pumped laser is capable of being light weighted and efficiently reducing an entropy of the renewable energy. Accordingly, the application of the solar light pumped laser to various equipments using a laser make it possible for providing industrial equipment with a reduced environmental load.

DESCRIPTION OF NUMERALS

10 - - - Solar light pumped laser, 12, 40, 50 - - - Laser media, 14 - - - Container device, 16 - - - Total reflection mirror, 18 - - - Half mirror, 20 - - - Solar light, 22 - - - Reflection element, 24 - - - Entrance window, 26 - - - Surface of incidence, 28 - - - Reflection element, 30 - - - Optical element, 100 - - - Solar light pumped laser, 102 - - - Fresnel lens, 104 - - - Container frame, 106 - - - Laser medium, 108 - - - Total reflection mirror, 110 - - - Half mirror, ARC - - - Anti-reflection coating, SH - - - Shell, CT - - - Cooling liquid

The invention claimed is:

1. A solar light pumped laser performing laser oscillation by pumping a laser medium with solar light, said solar light pumped laser comprising:

a laser medium;

a container device that supports said laser medium therein, said container device comprising a focusing optical element for irradiating solar light focused along said laser medium, while retaining cooling liquid in a space between said laser medium and said container device; and a pair of optical reflection elements arranged adjacent to opposing ends of said laser medium wherein said cooling liquid is water, and said focusing optical element forms a water lens using water as an optical medium, and said focusing optical element comprises an anti-reflection film formed on an end of said container device.

2. The solar light pumped laser according to claim 1, wherein said container device comprises a part transmitting solar light therethrough, a cross sectional shape of said part transmitting solar light of said container device and a refractive index of said cooling liquid comprises the focusing optical element in cooperation to pump said laser medium.

3. The solar light pumped laser according to claim 1, wherein said laser medium comprises a chemical species absorbing a wavelength contained in solar light to generate a population inversion directly or through energy transfer.

4. The solar light pumped laser according to claim 1, wherein said laser medium is selected from one or more of: a ruby ($Cr^{3+}:Al_2O_3$); YAG ($Nd^{3+}:Y_3Al_5O_{12}$); an alexandrite ($Cr^{3+}:BeAl_2O_4$); an emerald ($Cr^{3+}:Be_3Al_2(SiO_3)_6$); a laser medium formed by adding $Cr^{3+}$ and $Nd^{3+}$ to a garnet represented by general formula $A_3B_2C_3O_{12}$, site A being used an element selected from a group consisting of Ga and Al, site B being used an element selected from a group consisting of Ga, Sc and Lu, and site C being used an element selected from a group consisting of Y, Gd, La and Lu; a sapphire ($Ti^{3+}:Al_2O_3$); $Co^{2+}:MgF_2$; $Cr^{3+}:ScBO_3$; $Nd^{3+}:GGG$ ($Gd_3Ga_5O_{12}$); Cr and Nd:GSGG ($Gd_3(GaSc)_5O_{12}$); and a laser medium including a glass material, a laser medium being doped with a lanthanoid element including Ce, Pr, Pm, Sm, Eu, Tb, Dy, Ho, Er, Tm, Yb or Lu and ions thereof, or a laser medium including glass being doped with a transition metal element or an ion of said transition metal element.

5. A solar light pumped laser performing laser oscillation by pumping a laser medium with solar light, said solar light pumped laser comprising:
   a laser medium;
   a container device that supports said laser medium therein, said container device comprising a focusing optical element for irradiating solar light focused along said laser medium, while retaining cooling liquid in a space between said laser medium and said container device; and
   a pair of optical reflection elements arranged adjacent to the opposing ends of said laser medium, wherein said container device has an asymmetric shape of a cross section in a direction across said laser medium and holds a plurality of laser media corresponding to wavelength regions of solar light.

6. The solar light pumped laser according to claim 5, wherein said asymmetric shape of said solar light pumped laser is variable in accordance with an incident angle of solar light accompanied by diurnal motion of the sun.

7. The solar light pumped laser according to claim 5, wherein said laser medium comprises a center portion and a skirt portion for increasing an incident angle of focused solar light.

8. The solar light pumped laser according to claim 7, wherein said center portion of said laser medium is doped and said skirt portion of said laser medium is undoped.

9. The solar light pumped laser according to claim 7, wherein the dopant concentration of said center portion ranges from approximately 0.1 atom percent to approximately 4.0 atom percent.

10. A solar light pumped laser performing laser oscillation by pumping a laser medium with solar light, said solar light pumped laser comprising:
    a laser medium;
    a container device that supports said laser medium therein, said container device comprising a focusing optical element for irradiating solar light focused along said laser medium, while retaining cooling liquid in a space between said laser medium and said container device; and
    a pair of optical reflection elements arranged adjacent to the opposing ends of said laser medium, wherein said solar light pumped laser comprises a separate optical element for focusing solar light separately from said focusing optical element provided in said container device.

11. A cooling method for a solar light pumped laser performing laser oscillation by pumping a laser medium with solar light, said solar light pumped laser comprising a laser medium; a container device that supports said laser medium therein, said container device comprising a focusing optical element for irradiating solar light focused along said laser medium, while retaining cooling liquid in a space between said laser medium and said container device; and a pair of optical reflection elements arranged adjacent to the opposing ends of said laser medium, wherein said container device has an asymmetric shape of a cross section in a direction across said laser medium and holds a plurality of laser media corresponding to wavelength region of solar light, said cooling method comprising the steps of:
    retaining a cooling liquid in a space between said laser medium and a container device with a focusing optical element and
    focusing solar light on said laser medium.

12. The cooling method according to claim 11, wherein said cooling liquid cools said container device and said focusing optical element simultaneously.

13. The cooling method of a solar light pumped laser according to claim 11, wherein said container device comprises a part transmitting solar light therethrough, and a cross sectional shape of said part transmitting said solar light and a refractive index of said cooling liquid form said focusing optical element in cooperation.

14. The cooling method of a solar light pumped laser according to claim 11, wherein a solid body including a chemical species is used as said laser medium, said chemical species generating a population inversion by absorbing a wavelength contained in solar light.

* * * * *